United States Patent [19]

Patel

[11] Patent Number: 4,914,143

[45] Date of Patent: Apr. 3, 1990

[54] FLEXIBLE SILICONE COATINGS FOR PLASTIC SUBSTRATES AND METHODS FOR MAKING THERMOFORMABLE, ABRASION-RESISTANT THERMOPLASTIC ARTICLES

[75] Inventor: Gautam A. Patel, Clifton Park, N.Y.

[73] Assignee: General Electric Company, Schenectady, N.Y.

[21] Appl. No.: 185,594

[22] Filed: Apr. 25, 1988

[51] Int. Cl.[4] .................................................. C08F 2/46
[52] U.S. Cl. ..................................... 522/148; 522/172; 524/847; 524/858; 524/859
[58] Field of Search .................. 524/847, 859, 858; 522/148, 172

[56] References Cited

U.S. PATENT DOCUMENTS

| | | | |
|---|---|---|---|
| 3,986,997 | 10/1976 | Clark | 260/29.2 |
| 4,027,073 | 5/1977 | Clark | 428/412 |
| 4,159,206 | 6/1979 | Armbruster et al. | 106/287.12 |
| 4,308,317 | 12/1981 | Olson et al. | 428/412 |
| 4,368,235 | 1/1983 | Vaughn, Jr. | 428/412 |
| 4,419,405 | 12/1983 | Ashby et al. | 428/412 |
| 4,436,851 | 3/1984 | Vaughn, Jr. | 524/43 |
| 4,436,924 | 3/1984 | Ashby et al. | 556/416 |
| 4,477,519 | 10/1984 | Frye | 428/331 |
| 4,478,876 | 10/1984 | Chung | 427/54.1 |
| 4,500,669 | 2/1985 | Ashlock et al. | 524/440 |
| 4,525,426 | 6/1985 | Anthony | 428/447 |
| 4,544,582 | 10/1985 | Benjamin | 427/407.1 |
| 4,555,545 | 11/1985 | Kimura et al. | 524/858 |
| 4,624,870 | 11/1986 | Anthony | 427/387 |
| 4,680,232 | 7/1987 | Factor et al. | 424/412 |

Primary Examiner—Melvyn I. Marquis
Attorney, Agent, or Firm—Mary A. Montebello; James C. Davis, Jr.; William H. Pittman

[57] ABSTRACT

An improved silica-containing curable coating composition is described herein. The composition has an alkaline pH and contains a dialkyldialkoxysilane/alkyltrialkoxysilane mixture and a dispersion of ammonium-stabilized colloidal silica having an average particle size no greater than about 5-10 millimicrons. Methods for preparing such compositions are also disclosed, as are thermoplastic articles which include the cured protective coatings.

12 Claims, No Drawings

FLEXIBLE SILICONE COATINGS FOR PLASTIC SUBSTRATES AND METHODS FOR MAKING THERMOFORMABLE, ABRASION-RESISTANT THERMOPLASTIC ARTICLES

BACKGROUND OF THE INVENTION

This invention relates generally to protective coatings for plastic articles and to methods for making hard, flexible thermoplastic articles.

Engineering resins are well-known, commercially available materials possessing physical and chemical properties which are useful in a wide variety of applications. For example, polycarbonate has replaced glass in many products because of its excellent breakage resistance. Exemplary products made from polycarbonates include automobile head lamps and stoplight lenses; safety shields in windows, architectural glazing, and the like. However, a major defect exhibited by polycarbonates is their very low scratch-resistance.

Scratch-resistance coatings for plastics have been available in the prior art. As an example, H. Clark discloses an unpigmented coating composition for transparent plastics in U.S. Pat. No. 4,027,073. These coatings contain a dispersion of colloidal silica in a lower aliphatic alcohol-water solution of the partial condensate of a silanol. The composition is maintained at a pH in the range of 3.0 to 6.0. While this coating formulation is useful in some applications, there still remains room for improvement, especially when the coated plastics are expected to take the place of metal and glass in many present day products.

Protective coatings having a basic pH and containing a colloidal dispersion of silica are also known in the art. These compositions usually contain the base sodium hydroxide to stabilize the dispersion and thereby prevent its agglomeration or gelation. However, sodium hydroxide is nonvolatile and will not vaporize from the coating composition upon cure. It is believed that the presence of sodium hydroxide and salts produced therefrom catalyzes hydrolysis reactions which result in the formation of cracks in the cured coating under conditions of heat, humidity, and ultraviolet light exposure.

In U.S. Pat. No. 4,624,870, B. Anthony eliminated the problem related to sodium hydroxide by discovering a silica-containing coating composition having an alkaline pH and stabilized by the use of a base which is volatile at curing temperature. These coatings exhibit good physical properties under a variety of conditions.

As could be expected, the continuation of improvement in the performance of colloidal silica-based silicone coatings has encouraged those in the art to use the coatings in even more vigorous applications. For example, the coatings can be applied to large polycarbonate sheets which are then shaped and used as glazing, e.g., bus or subway car windows. These types of applications often require a high level of flexibility and weatherability while retaining excellent abrasion resistance.

As described in U.S. Pat. No. 4,159,206, an attempt was made by Armbruster et al. to impart weatherability and flexibility to colloidal silica-based coatings by the use of a mixture of dialkyldialkoxysilanes and alkyltrialkoxysilanes. While such coating compositions may provide an adequate combination of abrasion resistance and flexibility for some types of plastic articles, their overall performance falls short in some of today's more demanding product applications. For example, thermoplastic articles having such coatings applied therein are sometimes shaped by thermoforming techniques, i.e., heating the sheet to its softening temperature and then forcing the hot material against the contours of a mold by mechanical or pneumatic techniques. While the substrate may be quite amenable to thermoforming, the coatings themselves are very susceptible to thermal and bending stresses, and frequently exhibit cracking after the shaped product is cooled to room temperature.

Furthermore, articles coated with these compositions continue to be subjected to harsh conditions throughout their life. For example, the articles are often subjected to heating/cooling cycles in an outdoor environment, resulting in stresses caused by the difference in the thermal expansion coefficient for the plastic and for the silicone coating. Moreover, the coatings may be susceptible to general degradation from the effects of weather and ultraviolet light exposure.

It is therefore an object of the present invention to provide a colloidal silica-based coating composition having a high level of abrasion resistance and improved resistance to cracking under exposure to thermal and mechanical stresses.

It is another object of the present invention to provide a protectively coated, abrasion-resistant plastic article which may be thermoformed without cracking or other degradation of the protective coating.

It is yet another object of the present invention to provide a method for applying smooth, hard, flexible coatings over a thermoplastic substrate.

It is still another object of the present invention to provide an abrasion-resistant, thermoformable plastic article having a protective top layer characterized by high abrasion resistance, flexibility, and freedom from microcracks.

SUMMARY OF THE INVENTION

The coating composition of the present invention has an alkaline pH and includes a dispersion of ammonium-stabilized colloidal silica and a mixture of a diorganodiorganooxysilane and an organotriorganooxysilane. The colloidal silica particles used in this composition must have a diameter no greater than about 5 millimicrons to about 10 millimicrons.

When this coating is applied and cured onto a thermoplastic substrate such as polycarbonate, the resulting article exhibits a high level of abrasion resistance, weatherability, and flexibility. This invention further includes within its scope a method for making a silica-containing curable silicone resin coating composition, as well as a method for coating thermoplastic substrates with such a composition.

DETAILED DESCRIPTION OF THE INVENTION

The silica-containing curable coating composition of the present invention includes, as component (A), about 80% to 95% by weight of a mixture of a diorganodiorganooxysilane and an organotriorganooxysilane. The preferred amount of component (A) is about 85% to 95% by weight, with 88% to 94% by weight being most preferred. The weight ratio of diorganodiorganooxysilane to organotriorganooxysilane ranges from about 1:99 to about 15:85, with about 1:99 to about 12:88 being preferred, and about 8:92 to 12:88 being most preferred. The diorganodiorganooxysilane has the formula $R'_2Si(OR)_2$, and the organotriorganooxysilane has the formula $R'Si(OR)_3$, each R being independently selected from the group consisting of alkyl groups containing about 1-8 carbon atoms and aromatic groups containing about 6-20 carbon atoms, each R' being independently selected from the group consisting of alkyl groups containing about 1-3 carbon atoms and aromatic groups containing about 6-13 carbon atoms. Alkyl groups suitable for R and R' include methyl, ethyl, isopropyl, n-butyl, t-butyl, and the like. An example of an aromatic group which might serve as R or R' is the phenyl group. In preferred embodiments, R and R' are each alkyl groups containing about 1-3 carbon atoms, e.g., methyl, ethyl, or isopropyl.

Silanes of the type disclosed herein are known in the art, as is their preparation. For example, these materials are described in Clark's U.S. Pat. No. 4,027,073 and Armbruster et al.'s U.S. Pat. No. 4,159,206, both of which are incorporated herein by reference. The teachings of C. Eaborn's *Organosilicon Compounds,* Butterworths Scientific Publications, 1960, are also incorporated herein by reference.

Examples of suitable silane mixtures for this invention include methyltrimethoxysilane and dimethyldimethoxysilane; methyltriethoxysilane and dimethyldiethoxysilane; and methyltrimethoxysilane with dimethyldiisopropoxysilane. In view of cost, availability, and generally advantageous properties, the preferred mixture is methyltrimethoxysilane with dimethyldimethoxysilane.

The weight ratio of diorganodiorganooxysilane to organotriorganooxysilane in the present invention may range from about 1:99 to about 15:85, as mentioned above. Levels of diorganodiorganooxysilane greater than that prescribed here results in an undesirably low abrasion resistance for the articles of the present invention. However, the diorganodiorganooxysilane is a necessary component for this invention because of the flexibility and impact strength characteristics it provides, as further described below.

Component B of the present invention comprises about 5% to 20% by weight, and preferably about 6% to 12% by weight, of colloidal silica which is in the form of a dispersion in a water/aqueous solvent. These percentages are based on the solids portion of the dispersion. The dispersion is stabilized with a volatile base, i.e., one having a boiling point within the range of temperatures utilized to cure the coating compositions. The volatile base stabilizes the coating composition by providing a desired pH, and also acts as a catalyst for the curing of the coating. It is believed that removal of the base by evaporation prevents the undesirable catalysts of hydrolysis reactions which could promote cracking in the coating during temperature cycling and exposure to humidity or ultraviolet light.

The preparation and use of colloidal silica is well-known in the art. Reference is made, for example, to the *Kirk-Othmer Encyclopedia of Chemical Technology,* Vol. 20, Third Edition; and to the *Colloid Chemistry of Silica and Silicates,* R. Iler, Cornell University Press (1955). The contents of each of these references is incorporated herein by reference.

In general, the amount of colloidal silica is adjusted to achieve the optimal level of abrasion resistance, which is in part dependent on the surface area of the silica.

Suitable bases for component B are disclosed in B. Anthony's U.S. Pat. No. 4,624,870, incorporated herein by reference. Examples include alkyl amines of from about 1-6 carbon atoms, such as methylamine, ethylamine, and triethylamine; aromatic amines containing from about 5-7 carbon atoms, such as pyridine, aniline and methylaniline; and ammonia. The preferred bases are those which produce unstable salts upon neutralization which will dissociate at the cure temperature for the coating. Ammonia, which forms unstable salts with acetic and formic acids, is an especially preferred base for this coating. Thus, ammonium-stabilized colloidal silica is the preferred material for component B.

The amount of base used is that required to maintain a pH of from about 7.1 to about 7.8 for the coating composition as formed, i.e., before cure. An especially preferred pH range is about 7.2 to 7.8. The pH of the aqueous colloidal silica dispersions themselves are usually in the range of about 8.5 to 10.5.

The colloidal silica used in the present invention must have an average particle diameter no greater than about 5-10 millimicrons, as determined by transmission electron light microscopy, followed by image analysis. In preferred embodiments, at least about 80% of the colloidal silica particles have a diameter in the range of about 6-9 millimicrons, based on particle volume. Applicant has discovered that the use of this smaller-size colloidal silica in conjunction with the diorganodiorganooxysilane of component A results in a composition having excellent thermoformability characteristics throughout the range of diorganodiorganooxysilane employed. "Thermoformability" as used herein describes a characteristic in which a cured coating on a thermoplastic substrate is substantially free of cracks after the article has been thermoformed at elevated temperatures (e.g., above 150° C.), cooled, and subjected to bending stresses as described below. As further demonstrated by the following examples, the use of larger particle size colloidal silica outside the scope of this invention does not provide thermoformability when the diorganodiorganooxysilane level is varied within the above-mentioned range.

An example of a volatile base-stabilized colloidal silica suitable for the present invention is Nalcoag ® 2326, a product of Nalco Chemical Company. Nalcoag 2326 is an aqueous dispersion of ammonium stabilized colloidal silica, 14.5 weight percent $SiO_2$ in water, having a pH of 9.0.

Organic solvents suitable for component B are those which uniformly disperse the silanes of component A while also enhancing the flow of the coating compositions onto an underlying surface. Furthermore, the solvents must be chemically compatible with both the substrate and any primer which may be used.

Examples of solvents which may be used in combination with water for component B include methanol, ethanol, isopropanol, n-butanol, isobutanol, and glycol ether-based solvents such as any of the Cellosolve ® solvents, e.g., ethylene glycol monomethyl ether, ethylene glycol monobutyl ether, ethylene glycol monobutyl ether acetate, and ethylene glycol monoethyl ether acetate.

A mixture of solvents often provides advantages in terms of levelling characteristics of the coating composition. These solvent mixtures usually include a higher-boiling component such as one of the glycol ethers or n-butanol. One suitable solvent mixture is a blend of isopropanol and n-butanol in a volume ratio which can range from about 30:70 to about 70:30, respectively. Proportions beyond these ranges may cause surface streaking. Other examples of solvent systems include isopropanol with isobutanol, and isopropanol with ethylene glycol monomethyl ether. The components in these solvent systems can generally be used in the same proportions as the isopropanol/n-butanol solvent system. The solvent system may also include a water-miscible polar solvent such as acetone, methylethylketone, or diacetone alcohol, if they are present in amounts small enough so that their surface tension does not have an adverse effect on levelling. Those of ordinary skill in the art can easily experiment with different solvents to arrive at the optimum solvent system for the particular coating composition.

Furthermore, the volume ratio of water to total organic solvent usually ranges from about 20:80 to about 40:60.

Component C of the coating composition is a hydrolysis catalyst which helps to sustain the hydrolysis of the silanes. The hydrolysis catalyst is usually an acid, such as those described in S. Schroeter et al.'s U.S. Pat. No. 4,239,798, incorporated herein by reference. Suitable acids include hydrochloric, acetic, chloroacetic, citric, benzoic, formic, propionic, glycolic, malonic, toluenesulfonic, and oxalic. Acetic acid and formic acid are the preferred hydrolysis catalysts. In terms of cost, availability, effectiveness, and ease of use, acetic acid is most preferred. Furthermore, the catalyst can be used neat or in the form of an aqueous solution.

The hydrolysis catalyst is present in an effective amount, i.e., an amount low enough to maintain the alkaline pH, but high enough to catalyze the formation of the coating composition. This amount is usually about 0.5% to about 1.5% by weight, based on the total weight of the silanes. Most often, about 1% by weight of the hydrolysis catalyst is preferred.

In the preferred embodiments, the coating composition also includes an ultraviolet light absorber, which can be supplied in the form of an organic solvent solution, if desired. Examples of ultraviolet light absorbing compounds suitable for some embodiments of the present invention include those of the hydroxybenzophenone and benzotriazole series, as well as the cyanoacrylates or benzylidene malonates. Exemplary compounds are described by K. Benjamin in U.S. Pat. No. 4,544,582 and D. Olson et al. in U.S. Pat. No. 4,308,317, both incorporated herein by reference. These include 2-hydroxy-4-n-octoxybenzophenone; substituted hydroxyphenylbenzotriazole; and 2-(2-hydroxy-5'-methylphenyl) benzotriazole.

A preferred ultraviolet light absorber is one capable of co-reacting with either or both of the silanes, since such a material is less likely to volatilize from the coating composition during the heat-curing cycle. One very useful ultraviolet light absorbing agent of this type is a silylated compound having the formula

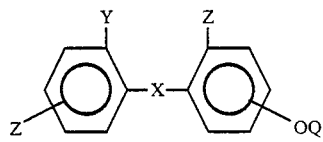

(I)

wherein X is

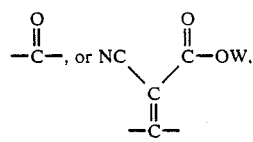

Y is H or OH; Z is H, OH, OQ or OW, wherein at least one Z in the ortho position is OH if Y is H; Q is —CH$_2$(CH$_2$)$_n$Si(R")$_x$(OR''')$_y$, and W is —C$_m$H$_{2m+1}$, x is 0, 1 or 2, y is 1, 2, or 3, x+y=3, n=0, 1 or 2, m=1 to 18, R" is an alkyl group having 1 to 6 carbon atoms, and each R''' is independently selected from the group consisting of alkyl or alkanoyl groups having 1 to 6 carbon atoms. The compound of formula I is described in U.S. Pat. Nos. 4,374,674 and 4,680,232 of Ashby et al. and Factor et al., respectively, both incorporated herein by reference. Examples of compounds of this type are provided in the reference patents. These include 4-[gamma-(trimethoxysilyl)propoxy]-2-hydroxybenzophenone and 4-[gamma-(triethoxysilyl)propoxy]-2-hydroxy benzophenone. Mixtures of these UV absorbers can also be used.

One useful silylated UV absorber composition of the present invention may be made by equilibrating a methanol solution of an ethoxy-substituted silylated UV absorbing agent of formula I, as taught by Anthony in U.S. Pat. No. 4,495,360, incorporated herein by reference. The methoxy to ethoxy ratio in this type of composition is usually in the range of about 4:1 to about 6:1.

Those skilled in the art can easily determine the appropriate level of ultraviolet light absorber for a particular coating system. Usually, about 4% to about 20% of ultraviolet light absorber (excluding solvent and based on total weight of the silanes) is sufficient, with about 10% to 12% being preferred. The level can be adjusted if ultraviolet light absorbers are also being used in a primer composition and/or in the substrate itself.

Those of ordinary skill in the art realize that various other additives may form a part of this coating composition. Examples of these additives are described in U.S. Pat. Nos. 4,680,232, 4,309,319, 4,311,763, and 4,495,360, each of which is incorporated herein by reference. Exemplary additives include effective amounts of thickening agents, pigments, dyes, anti-oxidants, flow modifiers, and surface lubricants.

In preparing the coating composition of this invention, the hydrolysis catalyst is usually premixed with the silanes, followed by addition of aqueous colloidal silica (which optionally contains a portion of the organic solvent being used). The temperature of the reaction mixture during these steps is usually kept in the range of about 20° C. to about 40° C., and preferably in the range of about 20° C. to 25° C. A reaction time of about 4 to 6 hours is usually sufficient to hydrolyze the silanes, such that the initial two-phase liquid mixture has been converted to a single liquid phase in which the colloidal silica is uniformly dispersed. Hydrolysis is usually allowed to continue for another 12 to 18 hours, for a total equilibration period of from about 16 hours to 24 hours, although these time periods can vary somewhat. As a general rule, the longer the time permitted for hydrolysis, the higher the final viscosity of the coating composition. The organic solvent is usually added to the reaction mixture after hydrolysis is substantially complete.

If used, the ultraviolet light absorbing compound is usually added with solvent at the completion of hydrolysis. Most of the other additives mentioned above can also be added at this time.

In some embodiments, the dialkyldialkoxy silane can be withheld initially and then later added according to the particular requirements of an end user.

As hydrolysis generates hydroxyl substituents to form silanols from the silanes, a condensation reaction begins to form silicon-oxygen-silicon bonds, although complete condensation usually does not occur. The siloxanes being produced retain a quantity of the silicon-bonded hydroxy groups, usually about one such group for every three —SiO— units, thereby resulting in continued solubility of the polymer in the water-alcohol solvent mixture. Thus, a portion of the coating composition is often referred to as a "partial condensate". In view of this occurrence, it is to be understood that in addition to components (A), (B) and (C), the coating composition further comprises any reaction products of these components. However, the weight percentages provided herein for the various coating components are based on the composition as formulated.

After addition of all ingredients, the coating composition may be adjusted with solvent to contain from about 10% to about 50% by weight solids, and more preferably, from about 15% to about 25% by weight solids. The final solids content will of course be dictated by various factors, such as desired viscosity and type of coating application.

After the hydrolysis reaction, it may be necessary to adjust the pH of the composition to fall within the pH range specified above. Volatile bases such as ammonium hydroxide are preferably used to raise the pH, while volatile acids such as acetic acid or formic acid are preferably used to lower the pH.

The substrate for the article of the present invention is not particularly critical, and of course depends on the contemplated end use. Polycarbonates are preferred because of the wide variety of excellent physical and chemical properties they possess. Those based on bisphenol A are especially preferred. Further descriptions of polycarbonate polymers may be found in numerous patents, journals, and other texts. Other substrates which could be used include those formed of polyimides, acrylics, polysulfones, polyesters, copolyestercarbonates, cellulose acetate, and poly(diethylene glycol bis(allyl carbonate)).

Although the coating composition of this invention can be applied directly to a substrate surface, the use of a primer is often desirable when high levels of adhesion are required. Exemplary primers are discussed in the above-referenced B. Anthony patent, and in application Ser. No. 034,890, filed Apr. 6, 1987, now U.S. Pat. No. 4,842,941, the teachings of which are also incorporated herein by reference. Suitable primer materials include thermoplastic acrylics polymerized prior to being coated onto the substrate, such as those formed by polymerizing at least one monomer of an acrylic acid ester or a methacrylic acid ester. Thermoplastic acrylic materials are further described in S. Schroeter et al.'s U.S. Pat. No. 4,339,798. Copolymers formed from acrylate or methacrylate monomers are also possible.

Polymethylmethacrylates and polyethylmethacrylates are the preferred primer materials for the article of this invention. Furthermore, it has been learned that the polyethylmethacrylates provide excellent crack resistance in thermoforming applications, and are therefore especially preferred. The polymers are advantageously dissolved in an organic solvent system prior to being used.

The primer system may further include effective amounts of a UV light absorbing compound such as those of the hydroxybenzophenone or benzotriazole type described in U.S. Pat. Nos. 4,239,798 and 3,043,709, the latter also being incorporated herein by reference.

Other additives can also be included in the primer, such as flatting agents, surface active agents, and thixotropic agents, all of which are well-known in the art and therefore do not require extensive discussion here.

The primer composition can be applied and then cured or dried on the substrate surface by well-known techniques. The thickness of the primer layer depends on the particular end use of the article, and usually varies from about 0.01 mil to about 0.03 mil.

The silicone coating composition can be applied on the substrate by conventional application techniques, such as dipping, spraying, or roll-coating.

In the absence of a cure catalyst, the coating compositions of this invention usually cure on a plastic substrate in about 2 hours at temperatures of about 120° C.

Cure catalysts may be used in the coating composition, and are in fact preferred in many commercial situations because of the beneficial reduction in cure time. Those catalysts which volatilize upon cure are preferred. Examples of such catalysts are those based on ammonia or amines, and include amine carboxylates such as dimethylamine acetate, ethanolamine acetate, dimethylaniline formate, and the like; as well as quaternary ammonium carboxylates such as tetramethylammonium acetate, benzotrimethylammonium acetate, and choline acetate.

It has been discovered that tetra-n-butylammonium acetate provides particularly fast cure rates at molar concentrations lower than many of the other catalysts, as described in the application Ser. No. 214,964, now U.S. Pat. No. 4,863,520 of A. Factor and G. Patel, assigned to the assignee of the present invention. Thus, use of this catalyst is preferred.

The amount of cure catalyst can vary widely, depending on the particular requirements for the coating. In general, the catalyst is present in an amount of from about 0.1 to about 1.0 weight percent, based on the weight of coating solids. When using the tetrabutylammonium acetate catalyst, the preferred catalyst level is about 0.3% to about 0.6%. When the cure catalyst is employed, the coating compositions of this invention cure on the substrate within a brief period of time, usually within 30 to 60 minutes at temperatures in the range of from about 100° C. to about 130° C.

As cured, preferred coating compositions of this invention comprise about 12% to 20% by weight ammonium-stabilized colloidal silica which has an average particle diameter no greater than about 5 to 10 millimicrons, and about 80% to 90% by weight of a condensation product of a mixture of a dialkyldialkoxysilane and an alkyltrialkoxysilane in a weight ratio within the range of about 1:99 to 15:85.

The thickness of the coated article of this invention is also dictated by its proposed end use. When used as glazing, the article usually has a thickness in the range of about 3 microns to about 10 microns.

The coatings of the present invention may be used to form an interfacial layer between a thermoplastic material such as polycarbonate (which can include a primer) and an abrasion-resistant top layer such as plasma-applied silicon dioxide. Other suitable top layer materials include silicon carbide, silicon nitride, silicon oxynitride, boron oxide, boron nitride, aluminum oxide, aluminum nitride, and titanium dioxide.

Methods of plasma deposition are known in the art and described, for example, by R. Bunshah et al. in *Deposition Technologies for Films and Coatings*, Noyes Publications, 1982, ISBN No. 0-8155-0906-5, the contents of which are incorporated herein by reference. Preferred methods of plasma deposition are described by J. Devins et al. in two applications: Ser. No. 034,890, filed Apr. 6, 1987, now U.S. Pat. No. 4,842,941 and Ser. No. 088,436, filed Aug. 24, 1987, now abandoned, both of which are incorporated herein by reference. Thus, the present invention includes a thermoformable plastic article comprising (A) a thermoplastic substrate, with or without a primer, (B) a silicone-based interfacial layer applied on (A) and formed from a coating composition containing a mixture of diorganodiorganooxysilane and organo-trimethoxysilane as described above and a colloidal silica dispersion wherein the average colloidal silica particle size is no greater than about 5-10 millimicrons; and (C) an abrasion-resistant top layer applied on (B), formed by plasma-enhanced chemical vapor deposition.

In conclusion, improved thermoformable, transparent silicone coatings have been described herein. As applied over a thermoplastic substrate, this type of coating provides a high level of hardness and flexibility, making it an ideal protective coating for substrates which are subjected to rigorous processing conditions, followed by demanding commercial applications. Furthermore, a plasma-deposited hard layer can be applied on the cured silicone coating to form an extremely abrasion-resistant article characterized by flexibility, as well as excellent adhesion between the hard layer and the substrate.

EXAMPLES

The following examples are provided to more fully describe the present invention. It is intended that these examples be considered as illustrative of the invention, rather than limiting what is otherwise disclosed and claimed herein.

A brief description of the tests utilized in some or all of the following examples will now be given.

Abrasion resistance was measured by the Taber abrasion test, ASTM D1044. The test utilizes a 1000 gram total weight load evenly distributed on the two rear wheels. The test was used in conjunction with ASTM D1003, in which the percentage of light scattering is measured before and after the specimen is Taber-abraded. The lower the value, the better the abrasion resistance and hardness. A Gardner Hazemeter, Model UX 10, was used for measurement of light scattering.

Strain-to-microcracking measurements were made on 10 cm×30 cm×0.32 cm coated samples. The test was conducted according to ASTM D790, using a three point bending jig attached to an Instron device. This device bends the sample and records the sample deflection at the time microcracking is observed. The strain-to-microcracking percentage may then be calculated, based on the deflecting value and dimensions of the sample. Larger values indicate better strain-to-microcracking characteristics.

Thermoforming tests were performed by placing bisphenol A-based polycarbonate sheets (15.2 cm×30.4 cm×0.64 cm) between two preheated and pre-bent aluminum plates at a bending radius of 190.5 cm. The plates were then heated in a convection oven at 157° C. ±2° for 2 minutes. After being taken out of the oven, the assembly was clamped and cooled to room temperature in a stream of cool air. During this time, the coating is subjected to both thermal and bending stresses. The articles were examined for cracks at the end of the cooling cycle.

A test to evaluate press polishability was also performed on the articles of the present invention. In effect, this test determines how well the silicone coating accommodates thermal expansion changes between the coating and the substrate when steps are taken to make the coating smooth. In this test, the coating composition specified in the example below was applied onto bisphenol A polycarbonate sheets (94 cm×137 cm×0.64 cm). After the coatings were cured for 90 minutes at 125° C., the coated sheets were sandwiched between two glass plates in a vacuum bag molding set up under 20 mm mercury pressure. The entire assembly was then subjected to a pressure of 120 psi in an autoclave for about 2 hours at a temperature in the range of about 145° C. to 150° C. After being cooled, the coatings were examined for cracking, loss of adhesion, and other surface characteristics.

Drape-forming characteristics, which are also indicative of the thermoformability of a coating, were performed on bisphenol A polycarbonate sheets having dimensions of 30.4 cm×46 cm×0.64 cm. The sheets (coated with the coating composition of this invention) were preheated to 158° C. and then bent to a desired radius on a felt-covered curved wooden mold by pressing down the hot, pliable sheet for about 2 minutes. After the sheets were bent, the coatings were examined for cracking or other defects. The coatings were also cold-formed to a particular bending radius to see if cracking occurred under those conditions.

Weathering performance was measured by the QUV® accelerated weathering test. This test was carried out in a model QUV environmental chamber manufactured by the Q-Panel Company. The samples were placed in the chamber and exposed for 12 hour periods consisting of 8 hour cycles at 70° C. with exposure to UV light (280 nm–350 nm, with a maximum at 313 nm, using FS-40 lamps), and 4 hour cycles at 50° C. with moisture condensation. Visual and microscopic examinations, as well as scribed adhesion measurements, were carried out weekly.

All percentages and other measurements are by weight, unless otherwise indicated.

Samples A–D were coating compositions outside the scope of the present invention because of the relatively large colloidal silica particle size. Table 1 lists the ingredients:

TABLE 1

| Silicone Compositions Outside the Scope of the Present Invention | | | | |
|---|---|---|---|---|
| | A | B | C | D |
| Methyltrimethoxysilane (gms) | 91.5 | 96.5 | 99.0 | 101.5 |
| Dimethyldimethoxysilane (gms) | 10.0 | 5.0 | 2.5 | 0.0 |
| Acetic acid (gms) | 0.62 | 0.62 | 0.62 | 0.62 |
| Ammonium-Stabilized Colloidal Silica[a] | 62.7 | 62.7 | 62.7 | 62.7 |
| Water (gms) | 20.7 | 20.7 | 20.7 | 20.7 |
| Isopropanol/n-butanol[b] (gms) | 185.0 | 185.0 | 185.0 | 185.0 |
| 53% m-SHBP in methanol (gms)[c] | 17.0 | 17.0 | 17.0 | 17.0 |
| pH | 7.2 | 7.2 | 7.1 | 7.1 |

[a]Ludox® AS-40, available from DuPont Company. 40% in water; pH = 9.2; average particle size of about 27 millimicrons.
[b]50/50 weight ratio.
[c]4-[gamma-(tri-(methoxy/ethoxy)silyl)propoxy]-2-hydroxy benzophenone. Methoxy/ethoxy ratio of about 85:15.

Samples F–H were coating compositions of the present invention. The average colloidal silica particle size was about 7 millimicrons. Sample E contained an amount of dialkyldialkoxy silane outside the scope of the invention. Sample I contained no dialkyldialkoxysilane, and thus was also outside the scope of this invention. Table 2 lists the ingredients:

TABLE 2
Coating Compositions of this Invention (except Samples E and I)

|  | E | F | G | H | I |
|---|---|---|---|---|---|
| Methyltrimethoxysilane (gms) | 86.5 | 91.5 | 96.5 | 99 | 101.5 |
| Dimethyldimethoxysilane (gms) | 15 | 10 | 5.0 | 2.5 | 0.0 |
| Acetic acid (gms) | 0.9 | 0.9 | 0.9 | 0.9 | 0.9 |
| Ammonium-Stabilized Colloidal Silica[a] | 68.3 | 68.3 | 68.3 | 68.3 | 68.3 |
| Isopropanol/n-butanol (gms)[b] | 165 | 165 | 165 | 165 | 165 |
| 53% m-SHBP in methanol (gms)[c] | 15 | 15 | 15 | 15 | 15 |

[a] Nalcoag ® 2326, as described supra, with an average particle size of about 7 millimicrons.
[b] 50/50 ratio.
[c] 4-[gamma-(tri-(methoxy/ethoxy)silyl)propoxy]-2-hydroxy benzophenone. Methoxy/ethoxy ratio of about 85:15.

Table 3 provides data related to initial physical properties for some of the coatings.

In each instance, the uncured coating composition was aged at room temperature for about 4 weeks and then catalyzed with 0.38% tetrabutylammonium acetate. The material was then flow-coated onto bisphenol A polycarbonate sheets which had previously been primed with a heat-cured polyethylmethacrylate coating containing, at 67% by weight solids, 2,4-dihydroxybenzophenone as a UV absorber. The cure time was about 90 minutes at 130° C.

The following results were obtained:

TABLE 3
Silicone Coating Compositions: Hardness and Flexibility

| Sample | Taber Abrasion Resistance % Haze (300 Cycles)[a] | % Strain to Microcrack[b] |
|---|---|---|
| E | 15.5 | 2.2 |
| F | 8.5 | 1.49 |
| G | 7.3 | 1.34 |
| H | 5.9 | 1.16 |
| I | 4.4 | 1.28 |

[a] Lower values indicate better abrasion resistance. A value of 7-9 or less is considered acceptable for most commercial applications.
[b] Higher values indicate better strain-to-microcrack characteristics. A value of 1% or more is considered acceptable for most commercial applications.

The figures in Table 3 demonstrates that the compositions of this invention exhibit a balance of high abrasion resistance and good strain-to-microcrack characteristics. Sample E is not part of this invention and exhibited poor abrasion resistance.

Table 4 provides results for the thermoforming tests described above:

TABLE 4
Thermoforming Results

| Sample[a] | Wt. % DMDMS[b] | SiO$_2$ Particle Size (nm)[c] | Observation of Cracking after Thermoforming to 75" Radius (192 cm) |
|---|---|---|---|
| A | 9.8 | 27 | No cracks |
| B | 4.9 | 27 | Cracked |
| C | 2.4 | 27 | Cracked |
| D | 0.0 | 27 | Many cracks |
| E | 14.7 | 7 | No cracks |
| F | 9.8 | 7 | No cracks |
| G | 4.9 | 7 | No cracks |
| H | 2.4 | 7 | No cracks |
| I | 0.0 | 7 | Cracked |

[a] Samples F, G and H are part of this invention.
[b] Dimethyldimethoxysilane, balance being methyltrimethoxysilane.
[c] Average diameter (millimicrons) measured as described above. Samples A–D used Ludox ® AS-40; Samples E–I used Nalcoag ® 2326.

The data in Table 4 demonstrate that the composition of this invention exhibit excellent thermoformability over a considerable range of dialkyldialkoxysilane level. In marked contrast, use of the larger particle size colloidal silica resulted in cracking as the dialkyldialkoxysilane level was varied, in Samples B–D.

Table 5 lists weathering properties based on the QUV test described above.

TABLE 5
Accelerated Weathering Properties

| Sample | Wt. % DMDMS[a] | QUV Failure Time (Hours) Delamination | Scribed Adhesion | Microcracking |
|---|---|---|---|---|
| A | 9.8 | 4000 | 4000 | None |
| E | 14.7 | 3300 | 3300 | None |
| F | 9.8 | 4000 | 4000 | None |
| G | 4.9 | 4400 | 4400 | None |
| H | 2.4 | 4800 | 4800 | None |

[a] Samples F, G, and H are part of this invention.

Table 5 shows improved weathering properties as the level of dimethyldimethoxysilane is decreased.

It should be noted that a composition like that of Sample F can also be prepared by post-addition of the dimethyldimethoxysilane to an aged composition (e.g., 2-4 weeks aging) like that of Sample I. A sample prepared in this manner exhibited an abrasion resistance value of 7.9% (haze), and was thermoformed to a 192 cm radius without microcracking. Accelerated weathering showed microcracking after 3500 hours, while the coating delaminated after about 4000 hours.

Table 6 provides data based on results of the press polishability test described above:

TABLE 6
Press Polishing Results

| Sample | Primer | Observation of Cracking, Adhesion, Other Characteristics |
|---|---|---|
| I | None | No cracking, tape adhesion failed |
| I | Thermoplastic Acrylic | No edge cracking, adhesion good |
| I | Thermoset Acrylic | 1" Long edge cracking, slight loss of adhesion |
| F | None | No cracking, adhesion failed |
| F | Thermoplastic Acrylic | Very light edge cracking, adhesion good |

The data in Table 6 demonstrate that the coatings of the present inventions, when used with a primed substrate, result in commercially acceptable, press-polished articles.

Table 7 details results of the drape forming test described above:

TABLE 7

Drape Forming Results

| Sample | Primer | Radius of Curvature 100" (254 cm) | 75" (191 cm) | 15" (38 cm) |
|---|---|---|---|---|
| F | SHP-300[a] | No cracks | No cracks | — |
| F | Thermoplastic[a] Acrylic | No cracks | No cracks | No cracks |
| F | None | No cracks | No cracks | — |
| I | SHP-300[a] | 10–15 cm long cracks | 5–10 cm long cracks | — |
| I | Thermoplastic[a] Acrylic | 0.3 cm long cracks | 2–10 cm long cracks | — |
| I | None | 1.3–2.6 cm long cracks | — | — |

[a]Each primer dried for 20 minutes at 130° C. Typical thickness was about 0.2–1.0 micron.

Table 7 demonstrates that coatings of the present invention are free of cracks, even under a high bending stress. In contrast, coating sample I, as cured, exhibited cracking under mild bending conditions, regardless of the use of a primer.

Table 8 describes the effect of primer composition on the thermoformability of coatings of this invention:

TABLE 8

Effect of Primer Coating on Thermoforming

| Sample Number | Coating Composition | Primer System Acrylic Polymer | Polymerized UV-Screener | Thermoforming at 157° C.[e] R = 50" (127 cm) | R = 25" (64 cm) | R = 15" (38 cm) |
|---|---|---|---|---|---|---|
| 1 | F | Polymethyl-[a] methacrylate | None | Cracks | Cracks | Cracks |
| 2 | F | Polymethyl-[b] methacrylate | Yes | No cracks | Cracks | Cracks |
| 3 | F | Polyethyl-[c] methacrylate | None | No cracks | No cracks | No cracks |
| 4 | F | Polyethyl-[d] methacrylate | Yes | No cracks | No cracks | Less than 15 cracks |

[a]3 parts by weight (pbw) Elvacite ® 2041 polymethylmethacrylate (DuPont) and 100 pbw Dowanol ® PM solvent (Dow Chemical Co.)
[b]2.3 pbw Elvacite 2041, 0.66 pbw copolymerized UV-screener (copolymer 78-6121, National Starch and Chemical Co.), and 100 pbw Dowanol PM solvent.
[c]3 pbw Elvacite 2042 and 100 pbw Dowanol EB solvent (Dow Chemical Co.)
[d]2.66 pbw Elvacite 2042 and 0.33 pbw copolymerized UV-screener (as in Sample 2); and 100 pbw Dowanol PM.
[e]Bisphenol A polycarbonate substrate. All primers dried for 20 minutes at 130° C. Primer thickness of 0.2–1.0 micron.

Table 8 demonstrates that a polyethylmethacrylate primer provides excellent adhesion between the substrate and the cured silicone coating composition. Furthermore, the use of a copolymerized UV absorber did not adversely affect adhesion or flexibility; only a few cracks appeared at the most severe bending radius.

Coatings of the present invention were evaluated as interfacial materials between bisphenol A polycarbonate substrates and plasma-applied silicone dioxide coatings. The polycarbonate sheets were first primed (SHP-300, as in Table 7) and then coated with sample compositions I and F. The coatings were cured at 130° C. for 90 minutes, as described previously. The article was then coated with a 4 micron-thick layer of silicon dioxide applied by plasma enhanced chemical vapor deposition, as described in the above-mentioned application of J. Devins et al., Ser. No. 034,890.

Plasma deposition parameters were as follows:

1. Nitrogen Pretreatment
   - Pressure: 750 mTorr
   - N₂ Flow: 1000 sccm
   - Power: 50 watts
   - Substrate Temperature: 100° C.
   - Voltage (DC): −15 volts.
2. Silicon Dioxide Deposition
   - Pressure: 900 mTorr
   - SiH₄ Flow: 2000 sccm (2% SiH₄ in He)
   - N₂O Flow: 1300 sccm
   - Power: 40 watts
   - Substrate Temperature: 100° C.
   - Voltage (DC): −9 volts
   - Run Time: 2 hr., 6 min.
   - Deposition Rate (on precoated substrate surface): approximately 350 angstroms per minute.

The samples were then subjected to a thermal cycle test at 85° C. and −35° C., with a two hour dwell time, and a temperature ramp rate of 2° C./per minute.

The silicon dioxide coating applied on top of the cured sample composition F was slightly microcracked after 10 cycles. The silicon dioxide coating applied on the cured sample composition I was severely microcracked after only 2 cycles, leading to the conclusion that the coatings of the present invention perform well as interfacial materials between a polycarbonate substrate and a hard, abrasion-resistant inorganic topcoat.

Other modifications and variations of the present invention are possible in light of the above teachings. It should thus be understood that changes may be made in the particular embodiments described herein which remain within the full intended scope of the invention as defined in the appended claims.

What is claimed is:

1. A silica-containing curable coating composition having an alkaline pH and comprising:
   (A) about 80% to 95% by weight of a mixture of a diorganodiorganooxysilane and an organotriorganooxysilane in a weight ratio within the range of about 1:99 to 15:85, wherein the diorganodiorganooxysilane has the formula $R'_2Si(OR)_2$ and the organotriorganooxysilane has the formula $R'Si(OR)_3$, each R being independently selected from the group consisting of alkyl groups containing about 1–8 carbon atoms and aromatic groups containing about 6–20 carbon atoms, each R' being independently selected from the group consisting of alkyl groups containing about 1–3 carbon atoms and aromatic groups containing about 6–13 carbon atoms;
   (B) about 5% to 20% by weight solids of colloidal silica in a water/organic solvent dispersion of ammonium-stablized colloidal silica having an average particle diameter no greater than about 5 to about 10 millimicrons;

(C) an effective amount of a hydrolysis catalyst; and any reaction products of components (A), (B), and (C).

2. The composition of claim 1 wherein the diorganodiorganooxysilane is a dialkyldialkoxysilane having the formula $R'_2Si(OR)_2$, and the organotriorganooxysilane is an alkyltrialkoxysilane having the formula $R'Si(OR)_3$, each R being independently selected from the group consisting of alkyl groups containing about 1 to 8 carbon atoms, and each R' being independently selected from the group consisting of alkyl groups containing about 1 to 3 carbon atoms.

3. The composition of claim 2 wherein the dialkyldialkoxysilane is dimethyldimethoxysilane, and the alkyltrialkoxysilane is methyltrimethoxysilane.

4. The composition of claim 2 having a pH of from about 7.1 to about 7.8, and substantially free of a base which is nonvolatile at the temperature selected for curing the coating composition.

5. The composition of claim 2, further including a blend of isopropanol and n-butanol.

6. The composition of claim 2 further including an effective amount of a silylated ultraviolet light absorber capable of co-reacting with either or both of the silanes.

7. A method for making a silica-containing curable silicone resin coating composition, which comprises admixing a mixture of a diorganodiorganooxysilane and an organotriorganooxysilane in a weight ratio within the range of about 1:99 to 15:85 with an effective amount of a hydrolysis catalyst, followed by the addition of an aqueous dispersion of ammonium-stabilized colloidal silica having an average particle diameter no greater than about 5-10 millimicrons, the pH of the reaction mixture being maintained between about 7.1 to 7.8, said reaction mixture also including at least one organic solvent, wherein the diorganodiorganooxysilane has the formula $R'_2Si(OR)_2$ and the organotriorganooxysilane has the formula $R'Si(OR)_3$, each R being independently selected from the group consisting of alkyl groups containing about 1-8 carbon atoms and aromatic groups containing about 6-20 carbon atoms, each R' being independently selected from the group consisting of alkyl groups containing about 1-3 carbon atoms and aromatic groups containing about 6-13 carbon atoms.

8. The method of claim 7, wherein the addition of silanes, hydrolysis catalyst, and colloidal silica dispersion is followed by an equilibration period of from about 16 hours to about 24 hours, during which a desired amount of silanol formation occurs, said equilibration period followed by the addition of the organic solvent.

9. The method of claim 7, wherein the temperature of the reaction mixture is maintained between about 20° C. and 40° C. during each mixing step.

10. The method of claim 7, wherein the dialkyldialkoxysilane is dimethyldimethoxysilane; the alkyltrialkoxysilane is methyltrimethoxysilane; the hydrolysis catalyst is acetic acid, and the organic solvents are isopropanol and n-butanol.

11. The method of claim 7, wherein the coating composition comprises about 80% to 95% by weight of the silane mixture and about 5% to 20% by weight solids of the colloidal silica dispersion.

12. The method of claim 7, wherein a silylated ultraviolet light absorber capable of co-reacting with either or both of the silanes is added to the mixture after the addition of at least a portion of the organic solvent.

* * * * *